United States Patent [19]

Sorenson et al.

[11] 3,980,628

[45] Sept. 14, 1976

[54] LARGE CAPACITY EXTERNAL COOLED VINYL HALIDE POLYMERIZATION REACTOR

[75] Inventors: Wayne R. Sorenson, Ridgefield; Peter A. Schwab, Bethel; Robert S. Allen, Danbury, all of Conn.; George Tillson; David J. Lorine, both of Oklahoma City, Okla.

[73] Assignee: Continental Oil Company, Ponca City, Okla.

[22] Filed: Feb. 18, 1975

[21] Appl. No.: 550,890

Related U.S. Application Data

[60] Division of Ser. No. 241,817, April 6, 1972, abandoned, which is a continuation-in-part of Ser. No. 228,089, Feb. 22, 1972, abandoned.

[52] U.S. Cl. .................................. 526/64; 526/88; 526/227; 526/344
[51] Int. Cl.² ..................... C08F 2/18; C08F 14/06; C08F 14/00
[58] Field of Search .................. 260/92.8 W, 87.5 R

[56] References Cited
UNITED STATES PATENTS

| | | | |
|---|---|---|---|
| 1,916,473 | 7/1933 | Forrest et al. ................ 23/285 UX |
| 2,926,182 | 2/1960 | Sutton ............................. 23/285 X |
| 3,319,937 | 5/1967 | Wilson et al. ........................ 259/8 |
| 3,321,283 | 5/1967 | Ewald ................................. 23/283 |
| 3,466,150 | 9/1969 | Dietze et al. ....................... 23/285 |
| 3,472,630 | 10/1969 | Baldwin et al. .................... 23/285 |
| 3,726,647 | 4/1973 | Somerville ..................... 23/285 X |
| 3,785,430 | 1/1974 | Pfeiffer et al. ....................... 165/1 |
| 3,825,512 | 7/1974 | Reiter et al. ................. 260/92.8 W |

FOREIGN PATENTS OR APPLICATIONS

| | | |
|---|---|---|
| 2,075,127 | 10/1971 | France |
| 1,331,192 | 9/1973 | United Kingdom |

*Primary Examiner*—Alan Holler
*Attorney, Agent, or Firm*—Richard W. Collins

[57] ABSTRACT

A process for polymerizing vinyl halide monomer in a large capacity reactor. Liquid polymerization medium comprising water, surfactant, and monomer is charged to the reactor, polymerization catalyst is added, and the polymerization medium is agitated in a manner to provide substantially laminar flow along a circular path about a generally vertical centrally located axis in the reaction zone. The polymerization medium is agitated in a manner to provide localized turbulent mixing near the periphery of the reaction zone, and the polymerization medium is maintained within selected ranges of temperature and pressure through the action of a vertical condensing tube positioned at the top of the reactor.

3 Claims, 6 Drawing Figures

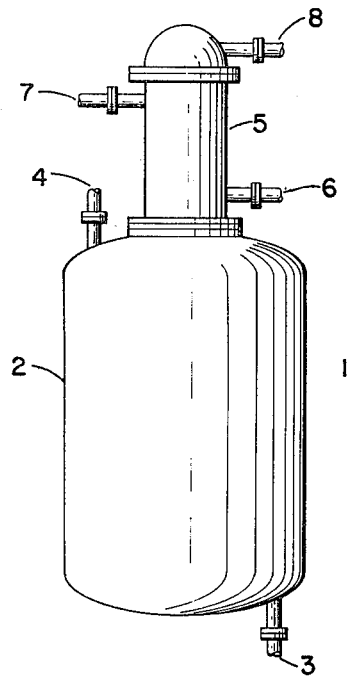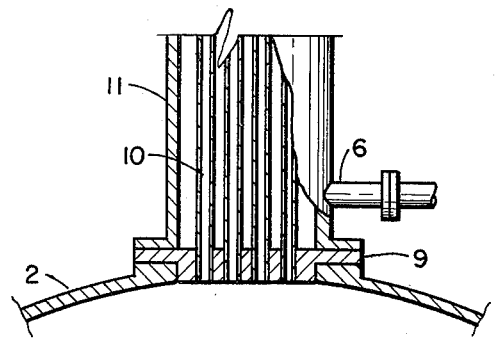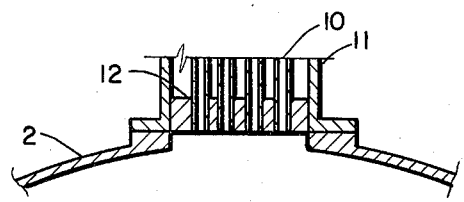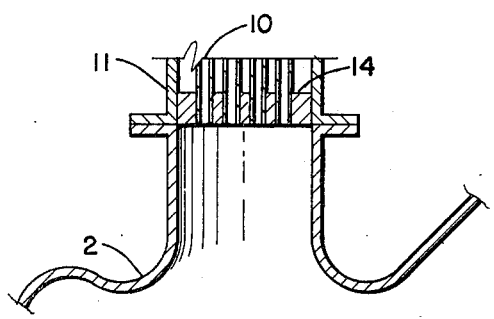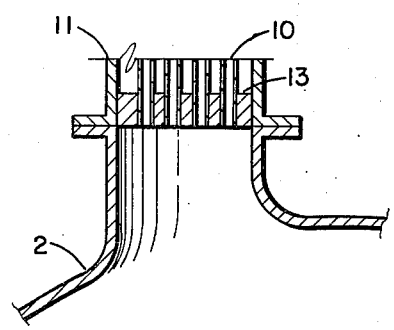
FIG. 1
FIG. 2
FIG. 3
FIG. 5
FIG. 4

3,980,628

LARGE CAPACITY EXTERNAL COOLED VINYL HALIDE POLYMERIZATION REACTOR

BACKGROUND OF THE INVENTION

This is a division of application Ser. No. 241,817, filed Apr. 6, 1972, now abandoned, which is a continuation-in-part of application Ser. No. 228,089 filed Feb. 22, 1972, now abandoned.

FIELD OF THE INVENTION

This invention relates to scale-up of a vinyl halide polymerization reactor and to external cooling and the type of agitation required for uniform polymer particles in aqueous dispersion vinyl chloride polymerization.

BRIEF DESCRIPTION OF THE PRIOR ART

Vinyl halide polymerization reactors have been relatively small and limited to capacities below about 5,000 gallons due to difficulties in providing adequate cooling and defining the agitation condition required to produce acceptable polymer particles. Numerous agitation and cooling systems have been used for reactors smaller than about 5,000 gallons capacity. Typical external cooling and agitation systems are described in U.S. Pat. Nos. 2,979,492 to Governale et al.; 2,618,626 to Van Dijk et al.; 2,754,289 to Meyer; 3,578,649 To Badguerahanian et al.; and 3,595,848 to Reinecke et al. and in German Offenlegungsschrift No. 2,055,198 to Glenn.

Such prior art patents show complex jacket type and external type cooling. They also disclose various agitation systems. These complex cooling and agitation systems create severe fouling problems with external cooling surfaces when scaled-up to large capacity reactors. Likewise, the prior art agitation systems in large reactors either do not provide the uniform mixing required for uniform polymer particles and particle size distribution in large reactors. Improper agitation results in particle agglomeration into particles that set up and block equipment or too much variation in particle size resulting in waste and uneconomical operation.

SUMMARY OF THE INVENTION

It has now been discovered that a particular tube type external cooling device can be used with a vinyl halide aqueous suspension polymerization reactor in a manner that removes the previous capacity limitation of about 5,000 gallons. This discovery eliminates the problem with fouling of cooling surfaces by polymer formation on the surface or by entrapment of large polymer particles on the surface. This discovery also makes it possible to use an external cooling device to remove substantially all the heat of polymerization and to control the reactor temperature with one standard external cooling device.

As a second feature of this invention, it has been discovered that the required combination of uniform mixing, shearing action and quiescent or substantially laminar environment required for production of normally solid, uniform, polymer particles and relatively uniform particle size distribution can be provided by a simple, economical reactor configuration and agitator design. The process and apparatus of this invention can be applied to batch or continuous polymerization processes to effectively control polymerization temperature and mixing conditions in a large capacity reactor without fouling the cooling or reactor surfaces and without the necessity of frequent cleaning and the health hazards associated with mechanically removing polymer which has set up in the reactor or coated the surfaces.

Improper mixing and cooling require a high water to monomer ratio for the aqueous dispersion to prevent agglomeration and high dispersant concentration to produce acceptable polymer particles in the 40–500 micron size range. The cooling and agitation systems of this invention make it possible to use a low water to monomer ratio in the range of about 10:1-1:1, and preferably in the range of about $\gamma$:1-1:1 with low or conventional dispersant concentration.

According to this invention there is provided a large capacity polymerization reactor for polymerizing in a liquid aqueous dispersion system normally solid, uniform polymer particles from monomers consisting substantially of at least one vinyl halide monomer comprising a. a generally cylindrical reaction zone with dish shaped ends,
b. said reaction zone having a rotatable agitator means sufficient to maintain the liquid phase in substantially laminar flow along a path about a generally vertical, centrally located axis in the reaction zone, and
c. said reaction zone having a stator type agitator means located generally vertically near the side periphery of the reaction zone sufficient to provide localized turbulent mixing in the liquid phase near the reaction zone periphery.

This invention also provides for a vinyl halide aqueous polymerization reactor the improvement of a cooling apparatus having a substantially vertical, externally cooled condensing tube flush-mounted with the interior of the reactor surface above the reaction zone so that condensate falls directly into the reaction zone. The condensing tube is preferably mounted near the top of the reactor so that vapor in the reactor will condense near the inner surface of the tube, flow downwardly along the tube surface counter-current to vapor entering the lower end of the tube, contact vapor in the reactor and fall directly into the reactor.

This invention also provides in a process for producing a predominantly vinyl halide polymer from at least one vinyl halide monomer which is substantially immiscible in water using an aqueous suspension containing (a) monomer, (b) catalyst, (c) suspension agent, and (d) water in a reactor at about 50–250 psig and about 80°–400°F, the improvement of using a flush-mounted substantially vertical externally cooled condensing tube to condense vapors in the reactor said condensing tube allowing condensate to flow downwardly in the tube, contacting the reactor vapors, and flowing directly into the aqueous suspension, thereby effectively controlling the reactor temperature and preventing polymer fouling of the condensing tube. This process is preferably applied to a suspension polymerization wherein vinyl chloride is the predominant vinyl halide monomer and especially where vinyl halide is at least 80 percent by weight of the total monomers used. This preferred process is operated at about 110–150 psig and about 120°–150°F using a conventional peroxide catalyst and a batch procedure.

BRIEF DESCRIPTION OF THE DRAWINGS

FIG. 1 is a side view showing a typical shell and tube condenser 5 mounted on top of reactor 2.

FIGS. 2 and 3 are cross-section views of arrangements for flush mounting a condenser on a symmetrical or central axis at the top of a reactor.

FIG. 4 is a cross-section of an arrangement for mounting a condenser off center at the top of a reactor.

FIG. 5 is a cross-section of an arrangement for mounting a condenser about a symmetrical axis of a reactor top with an upward inner slope.

DETAILED DESCRIPTION OF THE INVENTION

Figure 6:
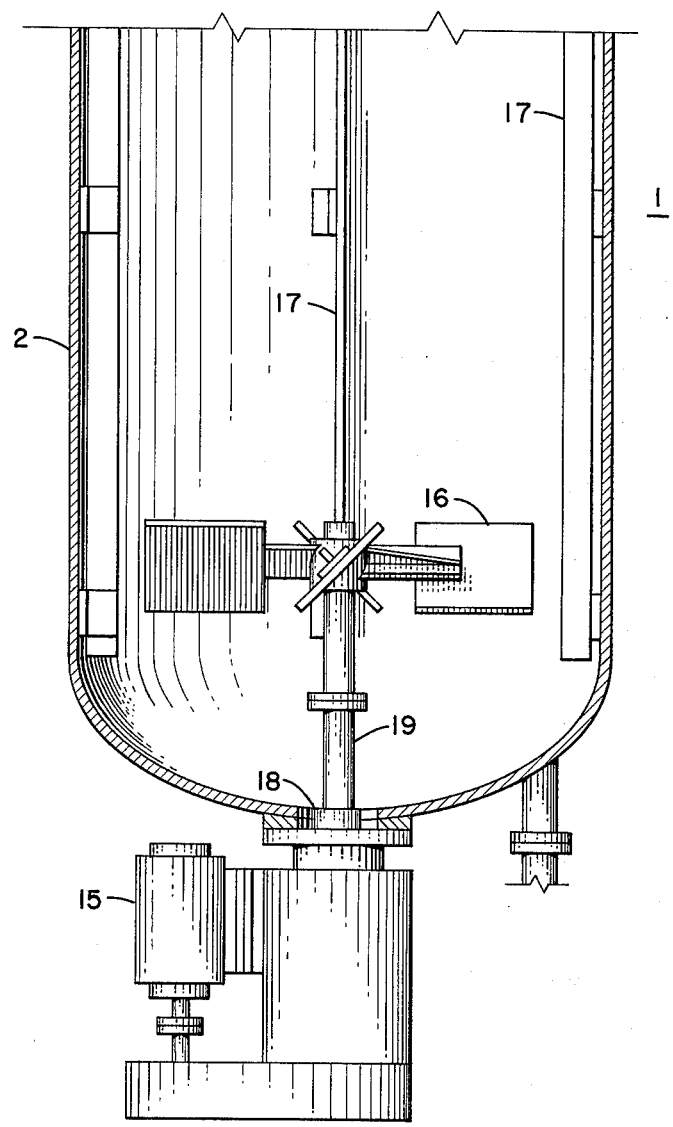
FIG. 6 is a vertical sectional view of the lower portion of the reactor shown in FIG. 1, showing one preferred embodiment of the agitator system.

The large reactor configuration of this invention is a generally cylindrical reaction zone with dish shaped ends. This reaction zone can have a circular, rectangular, or an approximately elliptical vertical cross-section or even a combination of these configurations. The preferred cross-section combines a cylindrical tank with dish or elliptically concave ends for economical construction and the simplest agitation system which will produce the critical mixing, shearing and substantially laminar flow areas in the liquid phase polymerization medium contained by the reactor. For preferred reactors the ratio of vertical length to horizontal diameter is in the range of about 1:1 to 4:1 with the optimum ratio being about 1.5:1 to 2.5:1. The cooling system, agitator system and reactor configuration of this invention can be used with small capacity reactors although cooling and mixing problems are not usually encountered with capacities below about 5,000 gallons. The improvements of this invention have been optimized for preferred reactors in the range of about 15,000–16,000 gallons, but can be used with larger reactors. Reactors larger than about 20,000 gallons may require slight modification or additional agitation due to further difficulties in capacity scale up, but these modifications can be performed by one skilled in the art in view of this disclosure to obtain the advantages of the simple, yet critical, cooling, agitation and reactor configuration improvements of this invention. (As used herein "substantially laminar flow" means the liquid polymerization phase as in laminar flow along the path about the centrally located vertical axis in the reaction zone and the turbulence is encountered only near the rotatable agitator means and the stator type agitator means.)

The improved agitation system of this invention comprises having in the reaction zone a rotatable agitator means sufficient to maintain the liquid phase in a substantially laminar flow along a path about a generally vertical, centrally located axis in the reaction zone and a stator type agitator means located generally vertically near the side periphery of the reaction zone sufficient to provide localized turbulent mixing in the liquid phase near the reaction zone periphery. The rotatable agitator means is preferably located in the lower portion of the reaction zone and is preferably a paddle type turbine. This rotatable agitator means must have the area and speed necessary to maintain the liquid phase in substantially laminar flow in a circular path about the reactor. For the preferred large reactors of about 15,000 gallon capacity, the ratio of the vertical cross-section area of the generally cylindrical figure generated by rotation of the rotor paddle to the vertical cross-section area of the reaction zone should be in the range of about 0.003–0.05. For this preferred configuration, a single turbine bottom entering agitator can be used and preferably has four paddle type agitator blades with a vertical projected area in the range of about 100–200 square inches. This turbine is operated at a speed in the range of about 60–180 revolutions per minute (r.p.m.) with an optimum speed in the range of about 100–150 r.p.m. The agitation required to provide substantially laminar flow will vary with the reactor size, liquid phase, viscosity, and other system parameters, therefore, the turbine area and speed factor must be varied to provide this substantially laminar flow. In other words, with larger reactors and higher viscosity of the liquid phase, the turbine area should be increased and the turbine speed should be decreased to in effect swirl the liquid phase about the reactor rather than merely violently agitating the liquid phase in the vicinity of the turbine blades. The turbine blades do provide an essential turbulent mixing zone in the area defined by the rotation of the turbine blades, which is necessary to provide uniform mixing, shearing and coalescence of agglomerated monomer droplets and polymer particles to insure uniform polymer particles and size distribution, therefore, it is essential that the agitation system and reaction zone be designed to promote passage of all of the liquid polymerization phase through the agitator turbine periodically. The cycle time for passing each particle through the agitated turbine varies with the polymerization rate, but for the preferred reactor size and process is in the range of about 5–30 minutes, and optimally about 5–10 minutes.

The cycle for passing each portion of the polymerization phase through the agitator turbine will be referred to herein as the "roll over time" since the liquid phase, in effect, passes upwardly or downwardly near the inner portion of the reaction zone and conversely passes upwardly or downwardly along the outer portion of the zone promoting a generally circular or elliptical circulation as viewed in each side of the reactor vertical cross-section. To promote this roll over circulation, the agitated turbines are preferably pitched to increase this upward or downward circulation in the inner portion of the reaction zone. A preferred rotatable agitator embodiment is shown in FIG. 6 with the stator type agitator means 17 shown attached to the reactor wall 2. A bottom entry rotatable agitator is shown with drive mans 15, sealing means 18, vertical shaft 19, and paddle type blades 16 on a single turbine. The agitator turbine blades are preferably pitched at an angle varying from 30°–60° with the vertical and optimally at about 40°–50°. The combination of roll over circulation and substantially laminar circular flow create a vortex effect on the upper surface of the liquid phase which is an indicator of proper mixing conditions and which also promotes uniform polymerization temperature in the liquid phase. This is accomplished by increasing the surface area of the liquid phase F or escape of low boiling components and for return and mixing of condensate from the overhead condensing tube to provide better control of polymerization temperature and faster temperature response to this control.

Conventional agitator means including propellor type, open turbine type, closed turbine type and circulating pump type can be used with this invention, but symmetrical open turbine type agitators are preferred and in addition open turbine agitators having an even number of symmetrically paired and evenly spaced agitator blades are preferred. For reactor configurations having a vertical length to horizontal diameter ratio at the extremes of the preferred range, multiple vertically spaced agitator blades or agitator turbines having blades at varying distances from the centrally located axis may be required to provide the substantial laminar flow and locally turbulent mixing required. Modification of the preferred turbine of this invention may also be required for reactors having unusual configurations such as a rectangular tank or others tending to have unsymmetrical flow patterns about the centrally located vertical axis. The agitation system of this invention are designed to provide accurate control of the break-up or shearing rate and the coalescence rate for monomer globules and polymer particles during the critical monomer-rich high polymerization rate phase of the aqueous vinyl halide polymerization. Control of the shearing rate and the coalescence rate is critical throughout the polymerization for uniform particle and particle size distribution, but control during the critical phase is essential to prevent polymer particle agglomeration, which results in coating and obstructing the interior surfaces and equipment of the reactor leading to blockages and setting up of the polymer which require manual removal.

The critical polymerization phase is the period of highest polymerization rate and highest monomer concentration.

The stator or a stationary type agitator means located near the side periphery of the reaction zone are relatively small so that they provide localized turbulent mixing but do not substantially interfere with the substantially laminar flow of the liquid phase or the roll over circulation of the liquid phase. The stator type agitator means can be simply a vertical plate fixed to the reactor wall, a series of small plates, peripherated plates, or even agitation means which provide a countercurrent circulation of the liquid phase. The preferred stator type agitation means due to economy of operation and installation is simply a vertical plate fixed to the reactor wall. For the preferred large capacity reactor in the 15,000 gallon range, the vertical stator plate extends the entire vertical length of the reactor side wall and the ratio of the vertically projected area of a stator type agitator plate to the vertical cross-section area of the reaction zone is in the range of about 0.005–0.1, with the preferred range being about 0.025–0.45. The preferred stator type agitator plate has a horizontal width in the range of about 0.05–0.15 of the diameter of the reaction zone and is preferably offset from the interior surface of the reaction zone about 0.05–0.15 of the diameter of the reaction zone. The blades of the stator type agitator means can be vertical or pitched.

DETAILED DESCRIPTION OF THE INVENTION

The improved vinyl halide polymerization reactor cooling apparatus of this invention consists essentially of a substantially vertical, externally cooled condensing tube flush-mounted with the reactor interior surface near the top of the reactor so that vapor in the reactor will condense near the inner tube surface and flow directly into the reactor. This invention provides a non-fouling cooling apparatus which is generally applicable to vinyl halide suspension polymerization. For optimum performance, the cooling tube length to diameter ratio should preferably be in the range of about 125:1 to 50:1. According to this invention cooling tubes can be mounted as single tubes or as a series of tubes grouped about the vertical axis of the reactor or offset from the vertical axis to provide cooling capacity as desired. The cooling tubes can be capped or connected by a common header. They can be cooled by any conventional means such as a water or air stream. A preferred embodiment consists of a modified shell and tube heat exchanger using water as the shell side cooling medium.

As used herein, flush-mounted means that the end of the cooling tube from which condensate runs back to the reactor is mounted near the reactor inner surface with no substantial projections in the path of the condensate flowing into the reactor. A short connecting sleeve or adapter can be used, but it is essential that the connection between the condenser and reactor has a diameter or cross-section at least equal to that of the condenser tube sheet. A condensing tube mounted directly on the reactor without a connecting sleeve or adapter is preferred. The condenser can otherwise be of any conventional construction. It can have a fixed or floating tube sheet at the end mounted on the reactor.

The non-fouling external cooling device of this invention makes it possible to remove substantially all of the heat from the polymerization reaction and control the temperature with this one external cooling device. The reactor jacket type heat exchange surface can be used to provide additional cooling to the reactor of this invention and is advantageously used to heat and maintain the liquid phase in the polymerization temperature range to initiate the polymerization, but the preferred reactor configuration of this invention has a ratio of the interior vertical surface of the reaction zone to the interior cooling surface area of the externally cooled condensing tube in the range of about 0.2–0.8, and preferably a ratio of less than 0.35 with a preferred surface area for the condensing tube of at least about 1,600 square feet. The preferred configuration also uses a flush-mounted, centrally located, standard shell and tube type heat exchanger, but other types of condensing tubes and even more than one shell and tube type heat exchanger can be used.

The preferred large capacity reactor of this invention has a generally cylindrical reaction zone of about 12 feet diameter and about 18 feet vertical sides with elliptically concaved, dished ends having a radius to depth ratio of about 2:1 giving the reaction zone a generally elliptical vertical cross-section with dimensions of approximately 12 by 24 feet. A standard bottom entering agitator is used with a four blade turbine approximately 5 feet from the lower end of the reaction zone having four 45° pitched turbine paddles located symmetrically about the central vertical axis of the reaction zone at a diameter of about 5 feet, that is, the four blade paddle turbine has an outside diameter from tip to tip of about 5 feet. The reactor has four vertical 6 inch by 18 foot stator plates attached perpendicularly to the vertical reactor wall offset about 6 inches from the wall and located symmetrically about the reaction zone. The preferred reactor has a standard shell tube heat exchanger of about 1600 square feet. The rotatable pitched agitator blades are pitched and rotated to promote downward circulation of the liquid phase in the inner portion of the reactor. Conventional inlets, outlets, control, power and sensing devices are understood to be used with the large capacity reactors of this invention.

The accompanying drawings illustrate one embodiment of the invention with several methods of flush-mounting the condenser on a reactor. As shown in FIG. 1, assembly 1 consists of a reactor 2 with a condenser 5 mounted directly on top. Conventional features such as stirrer, steam jacket, reactor parts, controls and other features are not shown. The reactor can be operated as a batch or continuous system with material passing through a pair of conduits 3 and 4 opening into the reactor via ports. Material can also be added or withdrawn through condenser 5 and a conduit 8. Shell-side heat transfer fluid, normally cooling water, circulates through a pair of conduits 6 and 7 and between tubes 10 and an outer shell 11.

FIGS. 2–5 show typical flush-mounted cooling tubes 10 and tube sheets 9, 12, 13 and 14. The fixed tube sheet 9 shown in FIG. 2 is a preferred embodiment of the invention, which shows the condensing tubes mounted directly on the reactor about a symmetrical vertical axis of the reactor, such as the central axis of a single dome capped reactor as shown in FIG. 1. The condenser can be mounted on one side of the reactor central axis and on different symmetrical vertical axes for the top of various reactor configurations. A symmetrical axis here denotes that the inner surface of the reactor top is generally symmetrical about the axis in the immediate vicinity of the axis. Fluid would tend to flow uniformly toward or away from the axis if only influenced by gravity and the reactor top inner surface. The inner reactor surface can slope downward away from the axis so that a portion of condensate from the cooling tubes can flow along the inner surface. Conversely, the inner reactor surface immediately adjacent the cooling tube can slope upwardly away from the tube so that condensate would fall from the edge of the tube thereby washing vapor below the tube.

The unexpected success of this invention in eliminating cooling tube fouling and mixing external cooling tubes generally applicable for temperature control of vinyl halide polymerization is not fully understood. However, the unexpected success is thought to be due to a combination of factors. For instance, condensate flowing from the cooling tube into the reactor through vapor in top of the reactor washes from the vapor any entrained polymer and catalyst which are likely to cause fouling. Condensate flowing down a cooling tube and along adjacent surfaces washes polymer and catalyst from these surfaces. A relatively thick layer of flowing condensate in these critical areas dilutes and reduces contact of polymerizable material with the reactor and cooling tube surfaces. Sharp, intricate and isolated, i.e., unwashed, surfaces are avoided by substantially vertical, flush-mounted cooling tubes. Thus, fouling is thought to be eliminated by both a washing action and avoiding intricate, remote mounting apparatus.

In one embodiment (not illustrated) of the invention monomer and/or purge gas can be added to or vented from the reactor through a header connecting the upper end of the condensing tubes, thus effecting an additional mode of reactor temperature and process control.

The process and apparatus of this invention are applicable to conventional vinyl halide polymerization processes. Such processes including procedures and components therefor are well known in the art. The U.S. patents cited herein illustrate such processes and components.

The following examples illustrate the invention. Parts, percentages and ratios are by weight unless otherwise indicated.

EXAMPLE 1

A reaction vessel constructed of glassed steel having a 300-gallon capacity and having a top-entering agitator, was equipped with a vertical tube heat exchanger with its tube sheet mounted directly onto an access port (nozzle) on the top of reactor. The arrangement was similar to that shown on FIG. 4. The heat exchanger was a conventional single pass shell and tube type having a total of 26 stainless steel tubes, each tube was ¾ inch in diameter and 8 feet long, comprising approximately 40 square feet of exchanger surface. The top of all tubes opened into a common chamber. Cooling water to the shell side of the exchanger was controlled automatically by a temperature controller sensing the batch temperature in the reactor. The reactor was charged with 800 pounds of vinyl chloride monomer, 1,560 pounds of water, 18.6 pounds of a 3 percent by weight solution of methyl cellulose, and 0.22 pounds of a peroxide catalyst. The mixture was heated to 127°F by means of circulating hot water through a surrounding jacket. Heat evolved from the polymerizing vinyl chloride was soon sufficient to maintain the reaction mass at specified temperature without the assistance of the jacket. From that time to the completion of the batch polymerization, the internal temperature was controlled by automatic adjustment of cooling water to the vertical heat exchanger. After 7 ½ hours, the reaction was complete. Inspection of the heat exchanger after over 2 weeks operation revealed no polymer buildup on tubes or tube sheet.

EXAMPLE 2

A preferred large capacity (16,500 gallon) reaction vessel having the preferred agitator and reactor configuration with a bottom-entering agitator was equipped with a vertical straight tube heat exchanger mounted directly on the top center of the reactor with its tube sheet nearly flush with the top of the reactor. Its arrangement was similar to that shown on FIG. 3. This heat exchanger was of conventional single-pass shell and tube design having 912 one-inch diameter tubes and 45, 1½ inch diameter tubes — all stainless steel tubes, 8 feet long. The resulting exchange surface was approximately 1,900 square feet. The inclusion of the two tube diameters was to determine the difference, if any, in degree of fouling between tube sizes. Cooling water to the shell side was controlled similarly to that in Example 1. The reactor was charged with 41,000 pounds of vinyl chloride, 1,270 pounds of a 1 ½ percent solution of methyl cellulose, and 67,000 pounds of water heated to approximately 135°F. Following the agitation of these ingredients, 8.3 pounds of a peroxide catalyst was added to the mixture. After a very short initiation period, the heat released by the polymerizing vinyl chloride and removed by condensing monomer vapor in the exchanger maintained the reaction mass at 127°F throughout the extent of the reaction. Reaction time was approximately 8 hours. Inspection of the heat exchanger after operation for over 30 days showed no significant tube fouling. There was no difference in appearance of between the surfaces of the 1-inch and 1 ½ inch diameter tubes.

EXAMPLE 3

This example is not within the invention and provides a basis for comparison. To illustrate what happens if the heat exchanger tube sheet is not directly mounted on the reactor, but is separated by a restricting device, we present the following experience. To a 6-inch port (nozzle) in the head of a 2,200-gallon glassed steel reaction vessel having a top-entering agitator was mounted a vertical heat exchanger having a tube sheet face of approximately 11 inches diameter. The difference in diameters between the nozzle and tube sheet, of course, required a transition connection. Cooling water to the heat exchanger sheet was controlled similarly to the previous examples. Reactions were carried out over the period of one weak using substantially the same formula as in Examples 1 and 2. Before the week ended, difficulties arose due to insufficient heat transfer. Upon inspection, it was found that both the connecting piece and the lower half of the exchanger tubes were nearly plugged with polymer.

We claim:

1. A process for polymerizing in a liquid phase aqueous dispersion system normally solid uniform polymer particles from monomers consisting substantially of at least one vinyl halide monomer comprising
   a. charging a generally cylindrical reaction zone with liquid polymerization medium consisting of water, surfactant, and monomer at a temperature and pressure sufficient to permit polymerization;
   b. then adding catalyst to initiate polymerization of the monomer;
   c. agitating the polymerization medium with a rotatable agitation means in a manner to provide substantially laminar flow along a circular path about a generally vertical centrally located axis in the reaction zone;
   d. agitating the polymerization medium near the reaction zone periphery with stator type agitation means in a manner to provide localized turbulent mixing near the periphery of the reaction zone; and
   e. maintaining the liquid polymerization medium at a temperature in the range of about 80°–400°F. and the reaction zone at a pressure in the range of about 50–250 p.s.i.g. by controlling heat flow of the polymerization by a substantially vertical condensing tube flush-mounted with the interior surface of the reaction zone above the reaction zone.

2. A process of claim 1 in which substantially all of the heat of polymerization is removed by the flush-mounted condensing tube; the predominant vinyl halide is vinyl chloride; the catalyst is a peroxide; the temperature is in the range of about 120°–150°F. and the pressure is in the range of about 110–150 p.s.i.g.

3. A process of claim 1 in which the rotatable agitation means provides substantially laminar flow along a circular path about a generally vertical centrally located axis; the rotatable agitation means provides a turbulent mixing-shearing zone in the vicinity of the rotatable means; and the rotatable agitation means circulates the medium to create a vortex effect in the liquid medium and promotes circulation of the liquid phase upwardly or downwardly in the inner portion of the reaction zone so that the liquid phase circulates from the inner portion of the reaction zone to the outer portion.

* * * * *

Disclaimer and Dedication 3,980,628.—*Wayne R. Sorenson*, Ridgefield; *Peter A. Schwab*, Bethel; *Robert S. Allen*, Danbury, Conn.; *George Tillson* and *David J. Lorine*, Oklahoma City, Okla. LARGE CAPACITY EXTERNAL COOLED VINYL HALIDE POLYMERIZATION REACTOR. Patent dated Sept. 14, 1976. Disclaimer and Dedication filed Sept. 2, 1980, by the assignee, *Conoco Inc.*

Hereby disclaims and dedicates to the Public the entire remaining term of said patent.

[*Official Gazette November 25, 1980.*]